(12) United States Patent
Conklin (10) Patent No.: US 9,909,309 B1
(45) Date of Patent: Mar. 6, 2018

(54) GLASS ANCHORING SYSTEM

(71) Applicant: Wayne Conklin, Butler, NJ (US)

(72) Inventor: Wayne Conklin, Butler, NJ (US)

( * ) Notice: Subject to any disclaimer, the term of this patent is extended or adjusted under 35 U.S.C. 154(b) by 0 days.

(21) Appl. No.: 15/401,179

(22) Filed: Jan. 9, 2017

(51) Int. Cl.
*E04B 5/46* (2006.01)
*E04B 1/00* (2006.01)
*E04B 1/18* (2006.01)
*E04B 5/02* (2006.01)
*E04C 1/42* (2006.01)
*E04F 15/02* (2006.01)
*E04F 15/10* (2006.01)

(52) U.S. Cl.
CPC ............. *E04B 5/46* (2013.01); *E04B 1/003* (2013.01); *E04B 1/18* (2013.01); *E04B 5/023* (2013.01); *E04C 1/42* (2013.01); *E04F 15/02011* (2013.01); *E04F 15/02016* (2013.01); *E04F 15/02044* (2013.01); *E04F 15/02183* (2013.01); *E04F 15/107* (2013.01)

(58) Field of Classification Search
CPC ... E04C 1/42; E04C 2/546; E04B 5/46; E04B 5/023
USPC ........................................................ 52/483.1
See application file for complete search history.

(56) References Cited

U.S. PATENT DOCUMENTS

| | | | | |
|---|---|---|---|---|
| 2,341,777 A * | 2/1944 | Hensel | ...................... | F27D 1/06 264/30 |
| 4,074,488 A * | 2/1978 | Ray, III | ............ | E04F 15/02405 52/126.6 |
| 4,178,656 A * | 12/1979 | MacFarlane | ........... | A47H 15/04 16/93 D |
| 6,413,618 B1 * | 7/2002 | Parker | ....................... | B32B 3/14 428/195.1 |
| 7,694,475 B2 * | 4/2010 | Rae | ........................... | E04B 5/46 52/263 |
| 8,683,764 B2 * | 4/2014 | Smith | ....................... | E04C 1/42 52/235 |
| 8,806,829 B2 * | 8/2014 | Pelc | ........................ | E04F 15/02 403/408.1 |
| 9,441,378 B1 * | 9/2016 | Conklin | ............. | E04D 13/0315 |
| 2002/0069603 A1 * | 6/2002 | Zornes | ................ | C04B 38/0022 52/612 |
| 2004/0134150 A1 * | 7/2004 | Rae | .......................... | E04B 5/46 52/481.1 |

(Continued)

FOREIGN PATENT DOCUMENTS

| | | | | |
|---|---|---|---|---|
| AT | 12030 U1 * | 9/2011 | ............. | E04B 5/023 |
| CA | 2373458 A1 * | 11/2000 | ............... | B32B 3/14 |

(Continued)

*Primary Examiner* — Babajide A Demuren
(74) *Attorney, Agent, or Firm* — Goldstein Law Offices, P.C.

(57) ABSTRACT

A glass anchoring system, for securing a pair of adjacent panels of structural glass to a mid support beam and creating a walkable glass. Each panel has a fastening edge and has an upper pane, a middle pane, and a lower pane. The middle pane has a cutout along the fastening edge. A pair of blocks fit within the cutouts and are laminated within the panels. When the panels are positioned upon the mid support beam, the blocks face each other across a gap between the adjacent panels. A connecting bar extends across the gap and into both of the blocks. A bolt extends in the gap, downwardly through the connecting bar, and tightens against the connecting bar as it secures to the mid support beam.

13 Claims, 9 Drawing Sheets

(56) References Cited

U.S. PATENT DOCUMENTS

| | | | |
|---|---|---|---|
| 2009/0110866 A1* | 4/2009 | Ainz | B32B 17/10055 428/53 |
| 2012/0297713 A1* | 11/2012 | Geith | A63C 19/065 52/306 |
| 2012/0311952 A1* | 12/2012 | Campbell-Lloyd | E04B 5/023 52/586.2 |
| 2014/0007526 A1* | 1/2014 | Wright | E04F 15/02183 52/127.4 |
| 2014/0096469 A1* | 4/2014 | Fountain | E04F 15/02044 52/650.3 |
| 2016/0168848 A1* | 6/2016 | Zago | B32B 17/10311 52/232 |
| 2016/0362902 A1* | 12/2016 | Lee | E04F 15/02161 |

FOREIGN PATENT DOCUMENTS

| | | | | |
|---|---|---|---|---|
| DK | 172087 B1 | * | 10/1997 | E04C 2/546 |
| EP | 0584659 B1 | * | 7/1998 | E04C 1/42 |
| JP | 2004316355 A | * | 11/2004 | |

* cited by examiner

GLASS ANCHORING SYSTEM

TECHNICAL FIELD

The present disclosure relates generally to a glass anchoring. More particularly, the present disclosure relates to a system for securing multi-panel glass assemblies in a decking application against upward forces.

BACKGROUND

Structural glass panels being used as a walkable surface is a relatively new and unexplored application. The nature of glass as a building material presents new challenges to architects and structural engineers, and thus requires the development of new systems and concepts to overcome these challenges.

Among the challenges of using structural glass is the difficulty of fastening panels. Many conventional fastening systems cannot be used with structural glass. In addition, one of the sought after features of glass as a building material is it's transparency and seamless appearance. Most conventional fasteners will either spoil this seamless appearance or reveal their unsightly nature since the nature of the glass would be to reveal that which is ordinarily concealed by opaque building materials.

One such challenge is using structural glass as a walkable surface for outdoor structures such as balconies, decks, and other cantilevered platforms. Since structural glass is quite heavy, for many indoor structures, the weight of the glass itself can be sufficient to ensure it will remain in place on a horizontal surface. However, for outdoor installations, wind becomes a factor. In particular, when strong winds blow under such structures, the weight of the glass alone may be insufficient to withstand upward forces exerted upon the glass panels. Direct fastening of the glass is necessary to prevent the glass panels from lifting when subjected to heavy winds.

Various fastening systems have been proposed and are available for securing a variety of building materials. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system that facilitates the use of structural glass in providing a walkable surface. Accordingly, the present disclosure provides an anchoring system for securing structural glass to supporting framework.

It is another aspect of an example embodiment in the present disclosure to allow large walkable surfaces to be created with multiple panels of structural glass. Accordingly, this anchoring system provides an effective solution for mid-span securing of adjacent glass panels.

It is yet another aspect of an example embodiment in the present disclosure to allow structural glass panels to be used in outdoor decking, while safeguarding against upward drafts from hurricane force winds. Accordingly, the anchoring system is configured to hold the panels securely in place when significant upward forces are exerted against the lowermost pane of each of the panels.

It is a still further aspect of an example embodiment to provide an anchoring system that has superior strength, while providing a nearly seamless, unobstructed appearance. Accordingly, the system employs blocks that are laminated into a middle pane of a multiple pane panel along their fastening edges. A fastener extends in a gap between the fastening edges of adjacent panes, connects the blocks of the adjacent panes, and secures them to a mid support beam upon which the panels rest.

Accordingly, the present disclosure describes a glass anchoring system, for securing a pair of adjacent panels of structural glass to a mid support beam and creating a walkable glass. Each panel has a fastening edge and has an upper pane, a middle pane, and a lower pane. The middle pane has a cutout along the fastening edge. A pair of blocks fit within the cutouts and are laminated within the panels. When the panels are positioned upon the mid support beam, the blocks face each other across a gap between the adjacent panels. A connecting bar extends across the gap and into both of the blocks. A bolt extends in the gap, downwardly through the connecting bar, and tightens against the connecting bar as it secures to the mid support beam.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 11:
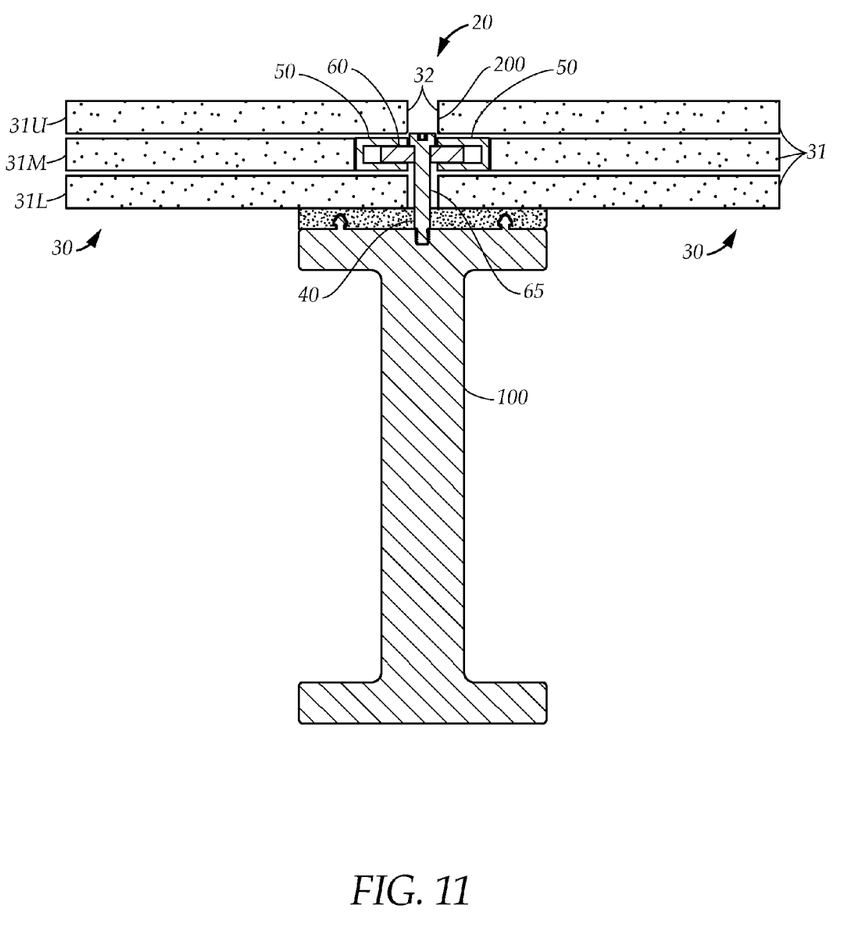
FIG. 11 is a side elevational view, with parts broken away, illustrating the fastener securing the glass panels to the beam, in accordance with the principles of the present disclosure.

FIG. 11 illustrates an overview of a glass anchoring system 20, for creating a walkable structural glass surface by securing two adjacent panels 30 of walkable, structural glass to a mid support beam 100. Note that such panels 30 are clearly also supported around a perimeter of the walkable structural glass surface, but the manner of support at the perimeter is beyond the scope of the present disclosure. The present disclosure is concerned with the mid span support and anchoring, where it is highly desirable to provide an unobstructed and aesthetically pleasing appearance while also ensuring that the panels 30 are securely fastened and can resist upward forces, such as may be experienced by extreme weather.

Each panel has at least two panes 31 of heavy structural glass, namely a lowermost pane 31L, an uppermost pane 31U, and a middle pane 31M. The panels 30 and its panes 31 each have a fastening edge 32. The fastening edges 32 of the adjacent panels 30 and its panes face each other across a gap 200 between the panels 30. The panels 30 are secured together with a fastener 40 that includes a pair of blocks 50, a connecting bar 60 that extends into the blocks 50 and across the gap 200, and a bolt 65. The bolt 65 extends through the connecting bar 60, vertically through the gap 200, and secures the connecting bar 60 to the mid support beam 100.

Figure 6A:
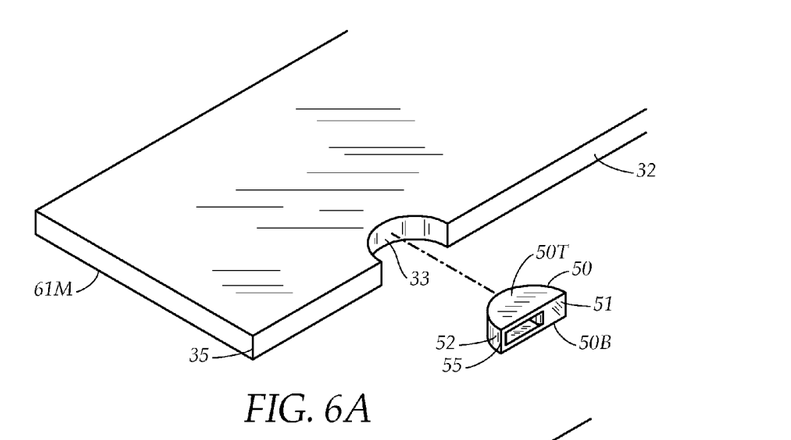
FIG. 6A is an exploded view, illustrating one of the blocks fitting into a cutout portion of a middle pane on one of the structural glass panels, in accordance with the present disclosure.

FIG. 6A shows the middle pane 31M and one of the blocks 50. Note that the middle pane 31M has a cutout 33 that extends laterally into the middle pane 31M from the fastening edge 32, and has a pane thickness 35. The cutout 33 is sized so that one of the blocks 50 fits securely therein. In particular, the block 50 has an inside surface 51, an outer wall 52 that is curved outwardly from the inside surface 51, a top surface 50T, and a bottom surface 50B. The blocks 50 are each in the shape of a half circle formed by the outer wall 52 with the inside surface 51 extending along a diameter of said half circle. The cutout 33 has an identically sized half circle shape so that the block 50 fits snugly therein. The top surface 50T and bottom surface 50B are substantially flat. A block thickness 55 is defined between the top surface 50T and bottom surface 50B. The block thickness 55 is substantially the same as the pane thickness 35.

Figure 6B:
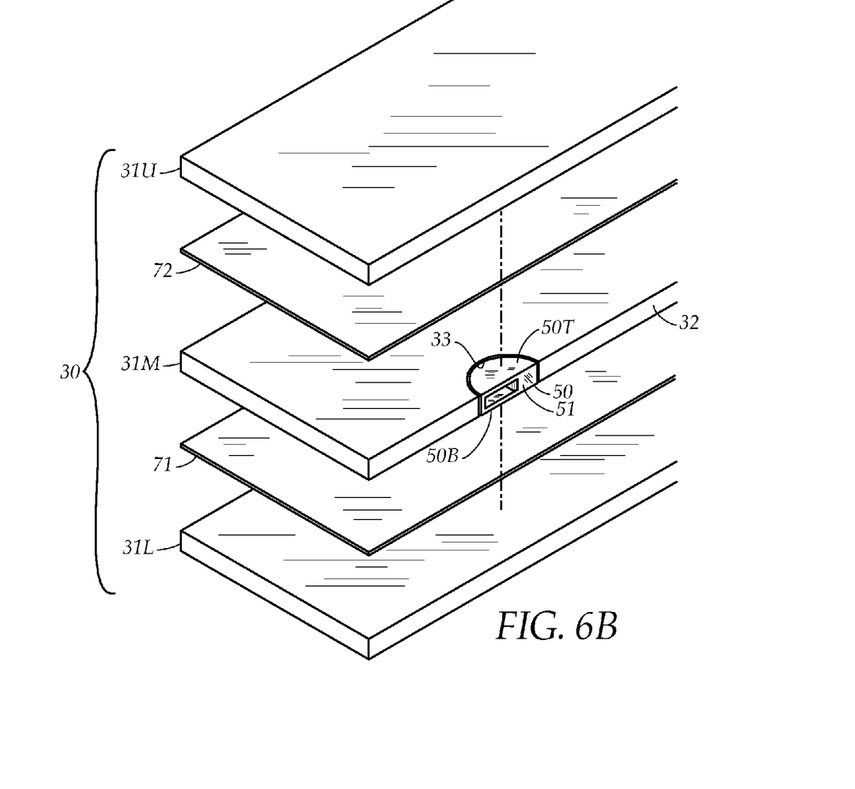
FIG. 6B is an exploded view, illustrating components being positioned for lamination of one of the structural glass panels, in accordance with the principles of the present disclosure.
Figure 7:
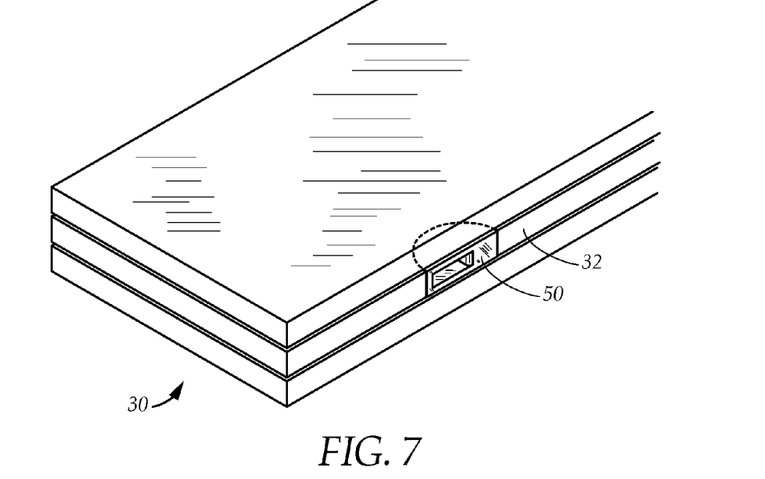
FIG. 7 is a diagrammatic perspective view illustrating one of the glass panels.
Figure 8:
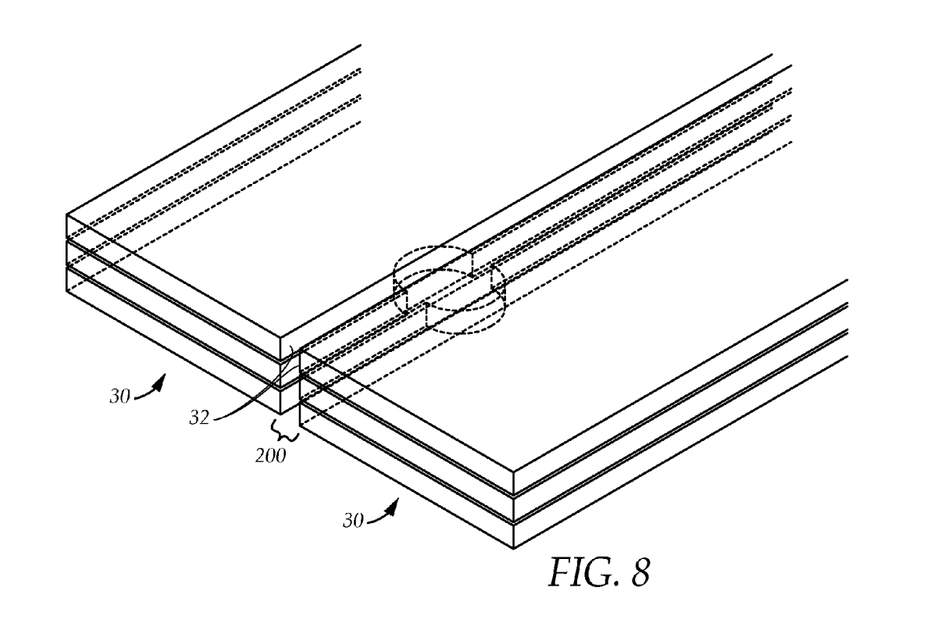
FIG. 8 is a diagrammatic perspective view, illustrating a pair of glass panels, positioned alongside each other, with the blocks aligned with each other and facing each other across a gap between the fastening edges of the panels.

Referring now to FIG. 6B, the block 50 is located within the cutout 33 of the middle pane 31M. The inside surface 51 is coextensive with the fastening edge 32, and the top surface 50T and bottom surface 50T are flush with the middle pane 31M. Now, with the block 50 in position within the cutout 33 of the middle pane 31M, the panes 31L, 31M, and 31U can be laminated to create the panel 30. The panel 30 is laminated using conventional laminating technology wherein the panes 31L, 31M, and 31U are bonded together, except in this case the block 50 is formed into the panel 30 during the lamination process. In particular, interlayer sheets are interposed between the panes 31 to bond to the glass surfaces using heat and pressure. The interlayer sheets are typically made of PVB (polyvinyl butyral), but any bonding material suitable for laminating structural glass may be used. As illustrated, a first interlayer sheet 71 extends between the uppermost pane 31U and a middle pane 31M and is bonded to the top surface 50T of the block 50. In addition, a second interlayer sheet 72 extends between the middle pane 31M and the lowermost pane 31L and is bonded to the bottom surface 50 of the block. Note that since the interlayer sheets 71, 72 are so thin, especially in proportion to panes 31L, 31M, 31U, they have been omitted in all other drawing figures for clarity. When the uppermost pane 31U, middle pane 31M, and lower pane 31L are laminated together, the block 50 is held securely and permanently within the panel 30, with the inside surface 51 coextensive with the fastening edge 32 as seen in FIG. 7. Referring to FIG. 7, with the block 50 bonded within the panel 30, the panel 30 is ready for installation. This lamination process is performed for two or more panels 30 that are to be positioned adjacent to each other, with their fastening edges 32 facing each other and separated by the gap 200, as seen in FIG. 8.

Figure 1:
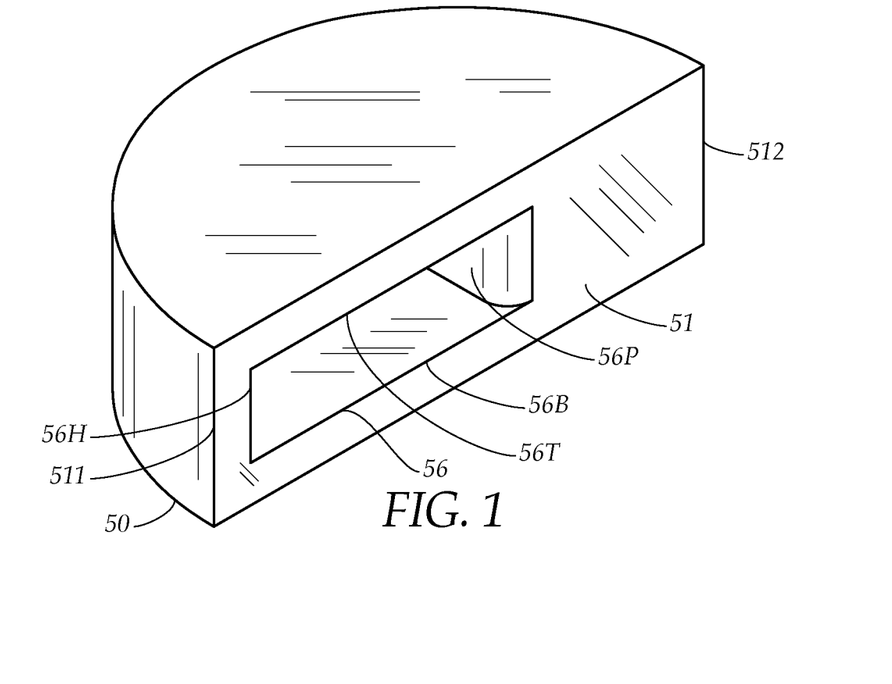
FIG. 1 is diagrammatic perspective view, illustrating a block portion of a fastener that is a component of the glass anchoring system in accordance with the present disclosure.
Figure 2:
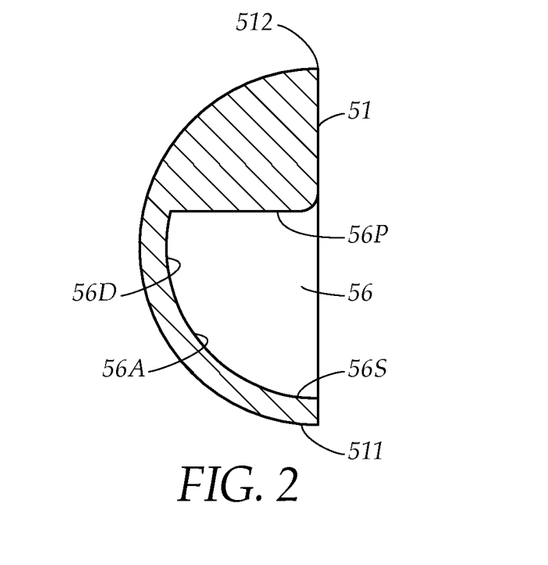
FIG. 2 is a top plan view of the block, with parts broken away, illustrating a hollow within the block.

FIGS. 1 and 2 further illustrate the block 50. In particular, the block 50 has a hollow 56 that laterally extends into the inside surface 51. The inside surface 51 has a first end 511 and a second end 512. The hollow 56b is substantially the shape of a circle quadrant, having a shallow end 56S near the first end 511, a deep end 56D substantially (just past) midway between the first end 511 and second end 512, and an arcuate inside wall 56A between the shallow end 56S and the deep end 56D. The hollow 56 has a stop wall 56P at the deep end 56D that extends perpendicular to the inside surface 51. The hollow 56 also has a hollow top 56T and a hollow bottom 56B, and a hollow height defined 56H between the hollow top and hollow bottom. The hollow height is substantially uniform throughout the hollow 45.

Figure 3:
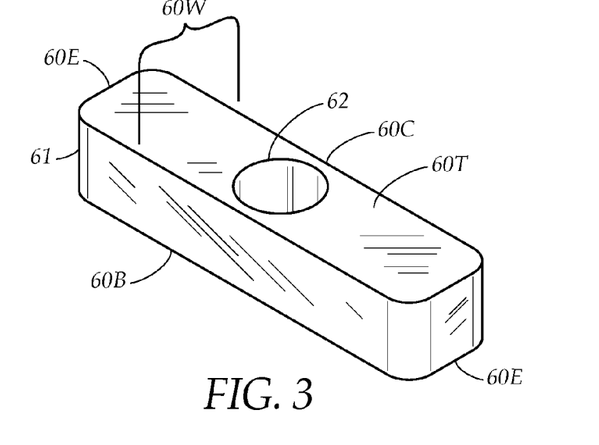
FIG. 3 is a diagrammatic perspective view, illustrating a connecting bar portion of the fastener.
Figure 4:
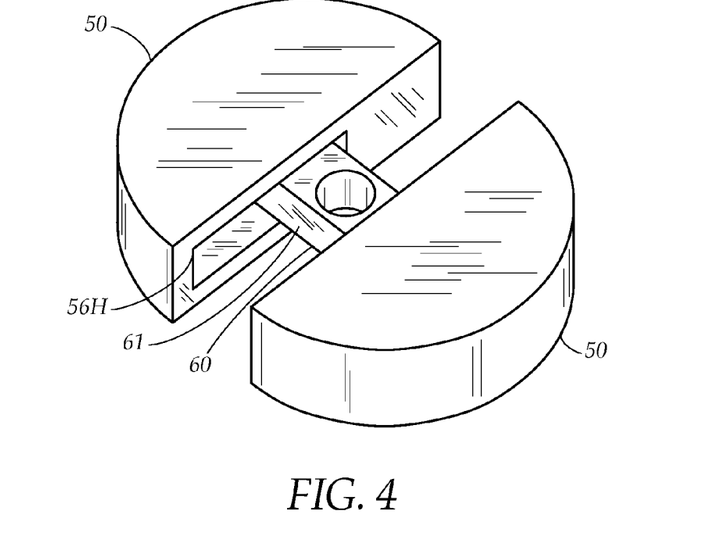
FIG. 4 is a diagrammatic perspective view, illustrating the connecting bar in conjunction with a pair of blocks.

FIG. 3 illustrates the connecting bar 60. The connecting bar 60 has a pair of ends 60E and a center 60C midway between the ends 60E. The connecting bar 60 also has a connecting bar top 60T and a connecting bar bottom 60B that are substantially parallel to each other. A central bore 62 extends vertically through the connecting bar 60 from the connecting bar top 60T to connecting bar bottom 60B at the center 60C. The connecting bar 60 has a connecting bar thickness 61 between the connecting bar bottom 60B and connecting bar top 60T that is substantially uniform between the connecting bar ends 60E. In FIG. 4, the connecting bar 60 is extending into a pair of blocks 50. As illustrated in FIG. 4, the connecting bar thickness 61 is substantially the same as the hollow height 56H, with a clearance fit. The connecting bar 60 also has a transverse width 60W, measured transversely of a longitudinal axis between the connecting bar ends 60E.

Figure 5A:
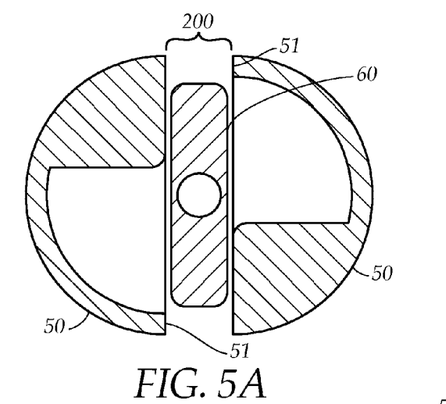
FIGS. 5A, 5B, and 5C are top plan views, with parts broken away, that illustrate relative positioning of the connecting bar and the pair of blocks, in various positions during installation of the fastener.
Figure 5B:
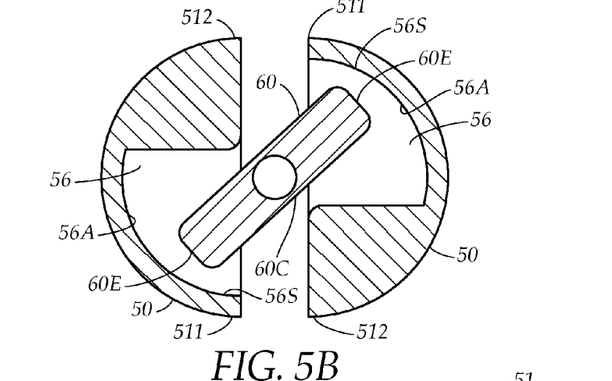
Figure 5C:
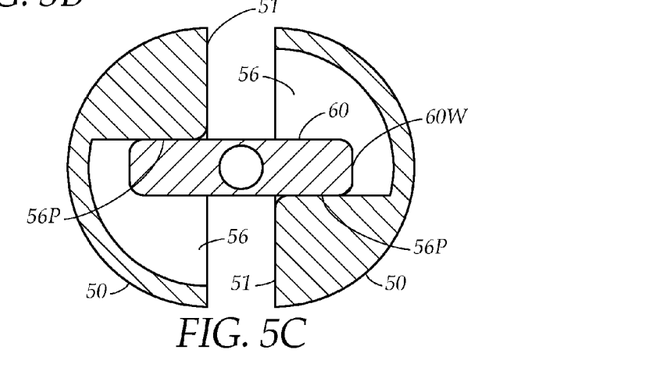

With their associated panels 30 omitted for clarity, the relationship between the connecting bar 60 and blocks 50 is illustrated in FIGS. 5A, 5B, and 5C. In particular, the blocks 50 are shown spaced apart by a distance equivalent to the gap 200 between panels 30 in an actual installation as seen in FIG. 11. Note that when the pair of blocks 50 oppose each other, the hollows 56 have complementary structure. That is, the first end 51I, and it's corresponding shallow end 56S of the hollow 56 of one of the blocks 50 is directly across from the second end 51²2 of the other block 50 that it faces. The arcuate inside walls 56A of the blocks 50 substantially trace two quadrants of the same circle, a circle that is centered on the center 60C of the connecting bar 60 that extends between the blocks 50. Also of note, as seen in FIG. 5C the stop walls 56P of the facing blocks 50 are offset by a distance that is substantially the same as a transverse width 60W of the connecting bar 60. An initial relative position of the blocks 50 and connecting bar 60 are seen in FIG. 5A, wherein the connecting bar 60 extends substantially parallel to the inside surface 51 of the blocks 50. This position allows the connecting bar 60 to move vertically within the gap 200 so that it is vertically aligned with the hollows 56. Then, the connecting bar 60 is rotated clockwise into position, as seen in FIG. 5B, wherein the ends 60E sweep through the hollow 56, roughly following the arcuate inside walls 56A of the blocks 56. Finally, the connecting bar 60 reaches the position of FIG. 5C, where the connecting bar 60 extends against the stop wall 56P of the hollows 56 of both blocks 50, substantially parallel to said stop walls 56P and perpendicular to the inside surfaces 51. Note that in FIG. 5C, the connecting bar 5C is in the optimal position for anchoring the glass panels. Removing the fastener would require rotating the connecting bar 60 counterclockwise by ninety degrees, so that it once again extends parallel to the inside surface 51 as shown in FIG. 5A, such that it can be retrieved upwardly through the gap 200.

Figure 9:
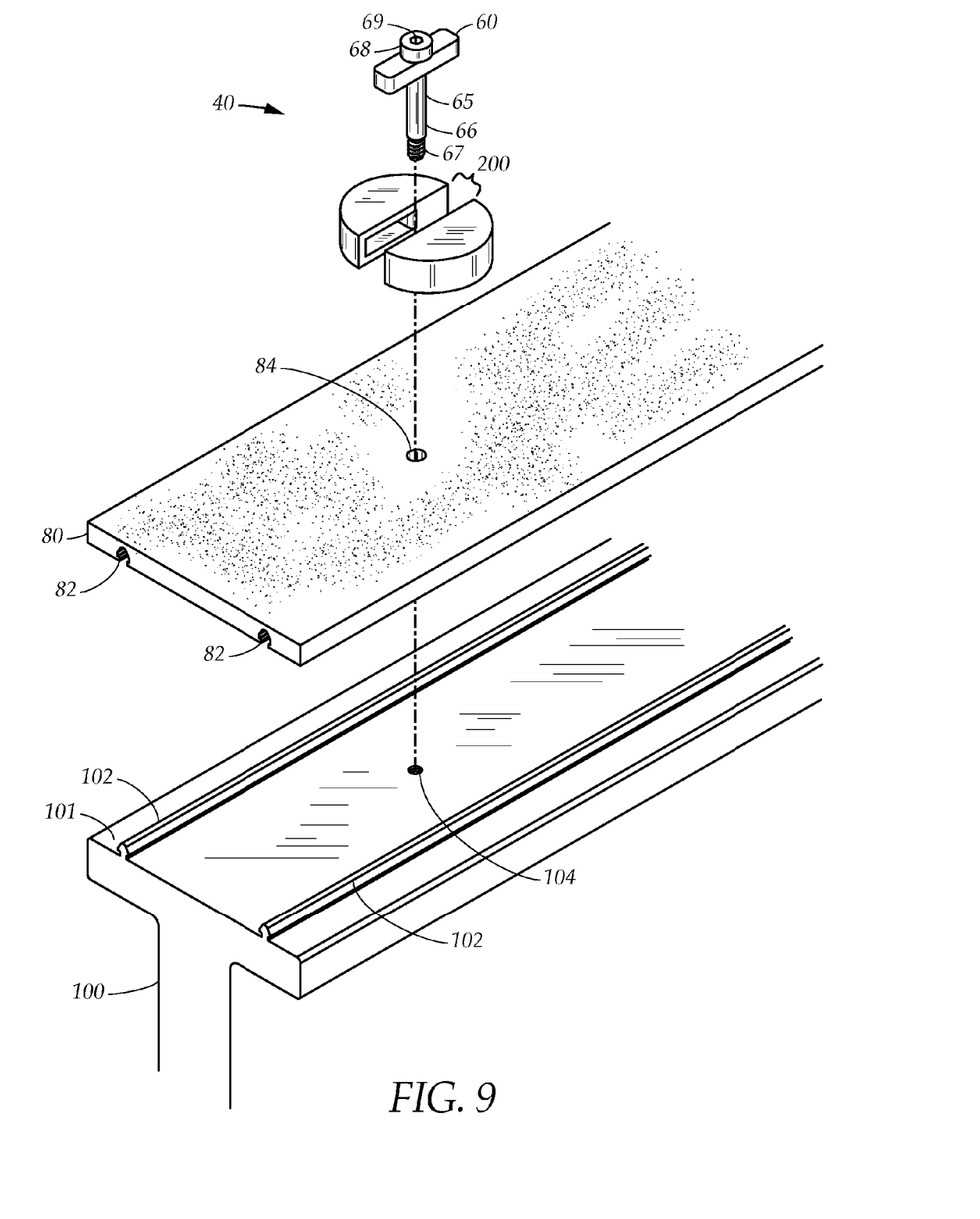
FIG. 9 is an exploded view, illustrating the fastener in conjunction with the mid support beam and glass setting gasket, wherein the glass panels themselves have been omitted for clarity of illustration.
Figure 10:
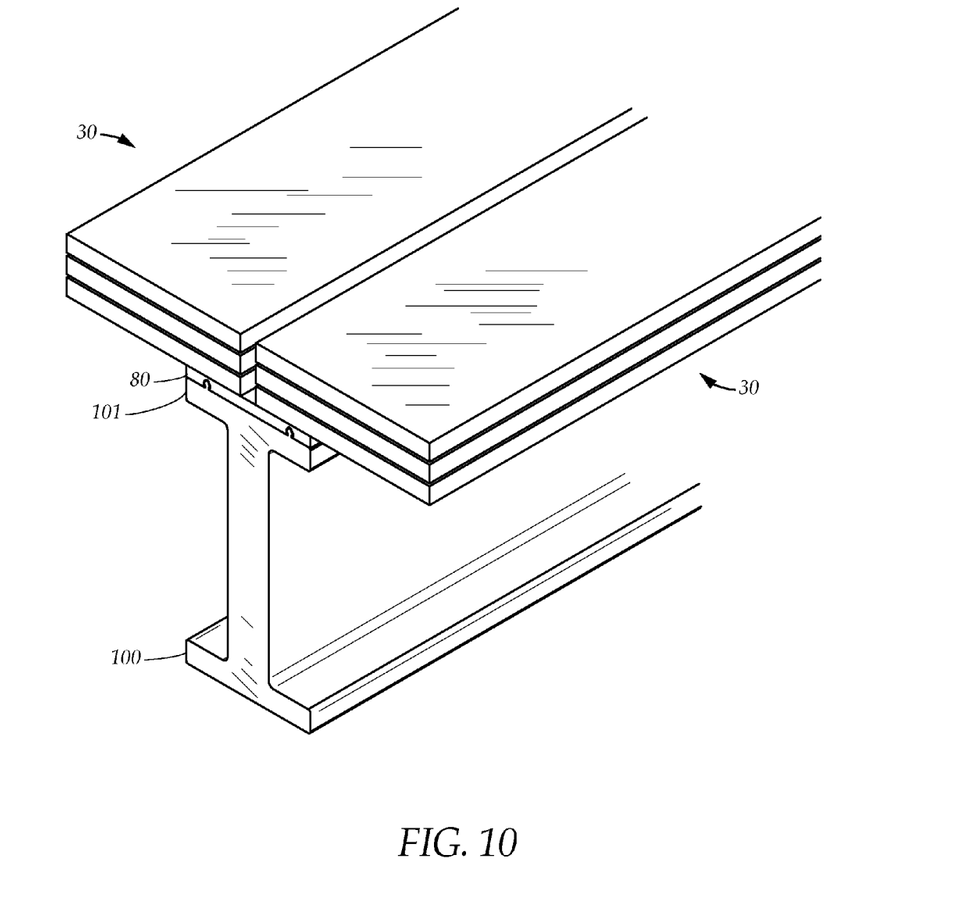
FIG. 10 is a diagrammatic perspective view, illustrating the glass panels positioned upon the glass setting gasket and supported by the mid support beam.

FIG. 9 illustrates an installation procedure with the fastener 40 with the structural glass panels 30 omitted for clarity. In particular, referring to FIGS. 9 and 10, generally a glass setting gasket 80 provides a broad surface for supporting the panels 30. The mid support beam has a top flange surface 101 that extends horizontally, upon which the glass setting gasket 80 is mounted. The glass setting block 80 is preferably made of a resilient material, such as rubber, and additionally may create a seal between the panels 30 and the mid support beam 100, and act to absorb shock and impact between the glass panels 30 and mid support beam 100. The mid support beam 100 may have protruding rails 102 extending along the top flange surface 101, and the glass setting gasket 80 may have grooves 82 for mating with the protruding rails 102 to securely seat the glass setting gasket 80 upon the mid support beam 100.

As illustrated in FIG. 9, the bolt 65 has a fastening end 66 and a tightening end 68. The fastening end 66 may have a threaded portion 67, and the tightening end 68 may have an engagement head 69. In the embodiment illustrated, the fastening end 66 is configured to extend downwardly through a gasket bore 84 and into the mid support beam 80. In particular, in this embodiment, the mid support beam 80 has a threaded opening 104 in the top flange surface 101. Accordingly, during installation of this embodiment, the fastening end 66 of the bolt 65 is extended downwardly through the gap 200 between the blocks 50, through the gasket bore 84 of the glass setting gasket 80, and into the threaded opening 104 in the mid support beam 100. The tightening end 68 is then rotated clockwise until the threaded portion 67 of the fastening end 66 is secured within the threaded opening 104 of the mid support beam 100. Note that as the bolt 65 extends through the connecting bar 60, the bolt 65 generally slips within the connecting bar as the bolt 65 is rotated clockwise. When the bolt gets tight, however, and the tightening end 68 is nearly flush and tight against the connecting bar 60, as the bolt 65 is rotated in the clockwise direction, the tendency is for the connecting bar 60 to also rotate in the clockwise direction. Advantageously, any clockwise rotation of the connecting bar 60 only acts to ensure that it is properly positioned in the optimal anchoring position within the blocks 50, as indicated in FIG. 5C.

Figure 12:
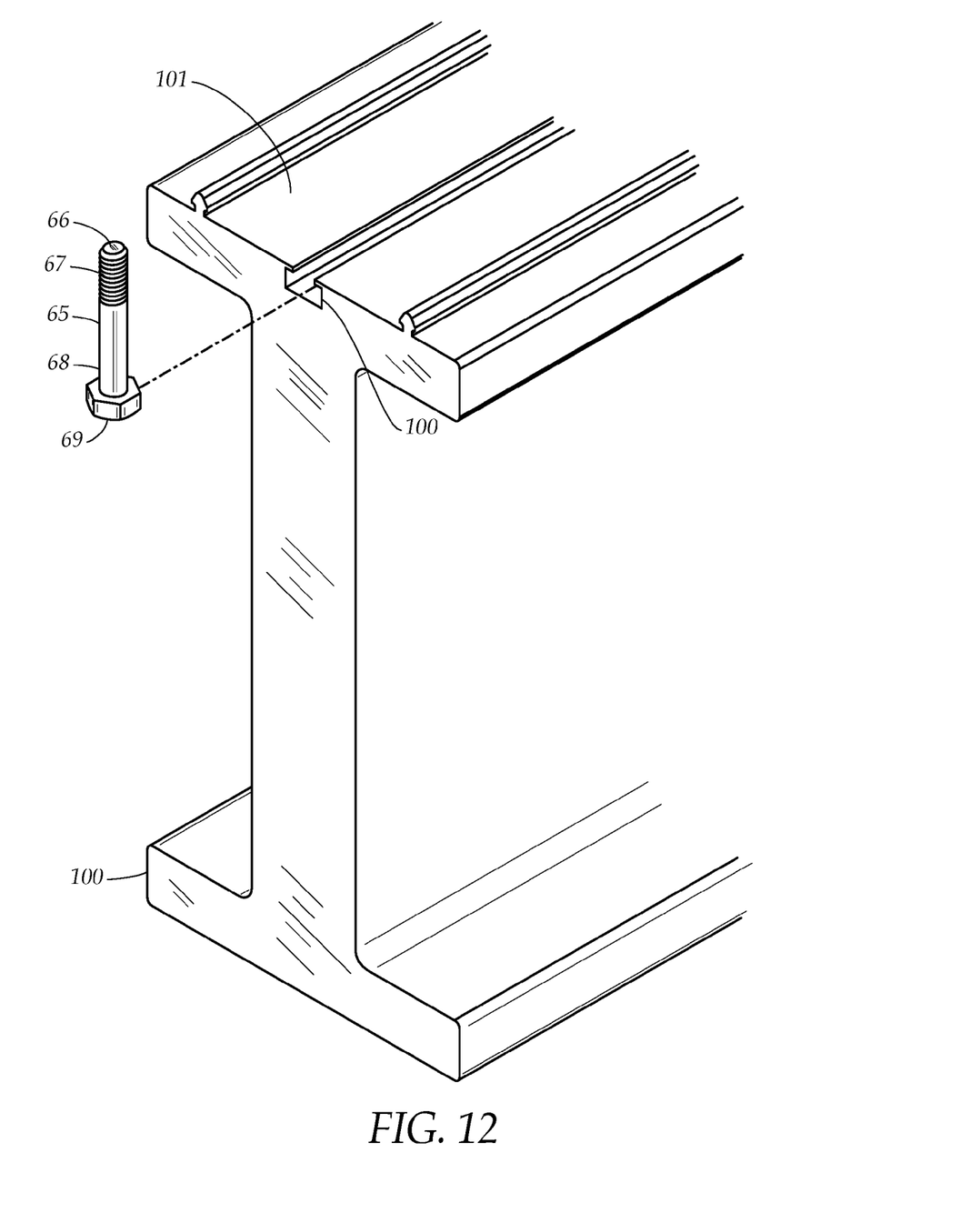
FIG. 12 is a diagrammatic perspective view of a further embodiment, illustrating an alternate arrangement for securing the bolt to the mid support beam.

FIG. 12 shows a further embodiment, wherein a T-shaped bolt track 106 is provided in the top flange surface 101 of the mid support beam 100. In this embodiment, the bolt 65 may be reversed, with the tightening end 68 oriented downwardly, such that the engagement head 69 is slid into the bolt track 106. The engagement head 69 may be a hex bolt head as illustrated, so that two opposite sides of the hexagon fit securely within the bolt track 106. The bolt is slid along the track 106 until positioned at an appropriate longitudinal position within said bolt track 106 where it will be longitudinally centered between the blocks (for example the equivalent longitudinal position of the threaded opening 104 shown in FIG. 9). Then after the glass panels are put in place, with the fastening end 66 oriented upwardly, the connecting bar could be extended downwardly onto the bolt 65 and a nut could then be fastened downwardly onto the threaded portion 67 and tightened against the connecting bar, while the tightening end 68 snugly within the track 106 acts to hold the bolt 65 steady against rotation so that said nut can be fully tightened against the connecting bar.

Referring again to FIG. 11, with the bolt 65 secured to the mid support beam 100 and the connecting bar 60 held tightly in place when it extends into the blocks 50 of both of the adjacent panels 30, upward force upon the lowermost pane 31L will be exerted against the block 50, the connecting bar 60, the bolt 65, and thus borne by the mid support beam 100. With the panels 30 thereby secured to the beam 100, the installation may be completed by filling the gap above the bolt 65 with a sealant, such as a Dow Corning Structural Silicone.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a glass anchoring system, for securing a pair of adjacent panels of structural glass. The disclosure is illustrated by example in the drawing figures, and throughout the written description. It should be understood that numerous variations are possible, while adhering to the inventive concept. Such variations are contemplated as being a part of the present disclosure.

What is claimed is:

1. A glass anchoring system, for providing a horizontal and walkable glass decking surface, comprising:
   a pair of adjacent structural glass panels, each structural glass panel having at least three panes of substantially the same size including an uppermost pane, a lowermost pane, and a middle pane, the structural glass panels each having a fastening edge, the panes of each glass panel also having fastening edges that are vertically aligned, the fastening edge of the two panels are next to and parallel to each other, separated by a gap, the middle pane of the glass panels each contain a cutout extending laterally from the gap into said panel;
   a mid support beam, the pair of adjacent structural glass panels are supported by the mid support beam near their fastening edges such the gap extends over the beam; and
   a fastening device that is secured to the beam, the fastening device includes a pair of blocks and extends upwardly through the gap, each of the blooks extend laterally beyond the fastening edge of one of the panels into the cutout of the middle pane of said one of the panels, such that upward force on the lowermost pane is exerted directly onto the fastening device.

2. The glass anchoring system as described in claim 1, wherein the pair of blocks each having an inside wall having a first end and a second end, an end opening from near the first end to substantially midway toward the second end and a hollow that extends into said block, the hollow having a shallow end near the first end of the block and a deep end substantially midway between the first end and second end, the hollow having an arcuate inside wall between the shallow end and deep end and having a stop wall at the deep end that extends perpendicular to the inside surface; wherein the connecting bar extending against and parallel to the stop wall of both blocks, and wherein the blocks are adapted so that the connecting bar may be rotated counter clockwise with respect to a vertical axis to remove the connecting bar from the blocks.

3. The glass anchoring system as described in claim 2, wherein the connecting bar has a pair of ends, the ends each extending within one of the blocks, and a center having a central bore; and further comprising a bolt, the bolt extending through the connecting bar and into the mid support beam for securing the connecting bar to the beam.

4. The glass anchoring system as described in claim 3, wherein the blocks each have an outer wall, a top surface, and a bottom surface; wherein the top surface and the bottom surface are substantially flat; and wherein the middle pane of each panel has a thickness, the blocks have a height between the bottom surface and the top surface that is substantially the same as the thickness of the middle panel; wherein for each panel a first interlayer extends between the uppermost pane and a middle pane and is bonded to the top surface of the block, and a second interlayer extends between the middle pane and the lowermost pane and is bonded to the bottom surface of the block.

5. The glass anchoring system as described in claim 4, wherein the blocks are each the shape of a half circle with the inside surface extending along a diameter of said half circle.

6. A glass anchoring system, for securing a pair of adjacent panels of structural glass upon a mid support beam, each panel having an uppermost pane, a lowermost pane, and a middle pane, the middle pane having a fastening edge and a cutout extending laterally into the middle pane from the fastening edge, the fastening edges of the middle panes of the adjacent panels parallel to each other and separated by a gap, comprising:
   a connecting bar having a pair of ends and a center having a central bore through said center;
   a pair of blocks adapted for extending in the cutout of one of the panels of glass, each block having an inside wall having a first end and a second end, an end opening from near the first end to substantially midway toward the second end and a hollow that extends into said block, the hollow having a shallow end near the first end of the block and a deep end substantially midway between the first end and second end, the hollow having an arcuate inside wall between the shallow end and deep end and having a stop wall at the deep end that extends perpendicular to the inside surface, the connecting bar extending into the hollow such that it may be rotated clockwise about a vertical axis extending through the center from the shallow end of both blocks to meet and extend against and parallel to the stop wall of both block; and
   a bolt extending through the central bore of the connecting bar, adapted for extending vertically through the gap between the panels when the blocks are seated within the cutouts of the middle panes of the adjacent panels for securing to the mid support beam.

7. The glass anchoring system as described in claim 6, wherein the blocks are each the shape of a half circle with the inside surface extending along a diameter of said half circle.

8. The glass anchoring system as described in claim 7, wherein the hollows each have a hollow top and a hollow bottom that are substantially parallel and have a hollow height between said hollow top and hollow bottom; and wherein the connecting bar has a connecting bar thickness that is substantially the same as the hollow height with a clearance fit.

9. The glass anchoring system as recited in claim 8, wherein the blocks each have an outer wall, a top surface, and a bottom surface; wherein the top surface and the bottom surface are substantially flat; and wherein the middle pane of each panel has a thickness, the blocks have a height between the bottom surface and the top surface that is substantially the same as the thickness of the middle pane.

10. The glass anchoring system as recited in claim 9, wherein the bolt has a shaft, a fastening end and a tightening end, the bolt is threaded on the fastening end and has an engagement head on the tightening end, and wherein the shaft of the bolt extends through the central bore of the connecting bar.

11. A glass anchoring method, for securing a pair of panels of structural glass to a mid support beam, each panel having a fastening edge, an uppermost pane, a lowermost pane, and a middle pane having a cutout along the fastening edge, using a fastener having a pair of blocks that each have an inside wall and a hollow extending into said block from the inside wall, one of the blocks extending in the cutout of one of the panels with the inside wall aligned with the fastening edge, the fastener also having a connecting bar having a pair of ends and a central bore, and a bolt, comprising the steps of:
   positioning the glass panels onto the beam with their fastening edges substantially parallel to each other and separated by a gap and with inside wall of the blocks facing each other across the gap;
   extending the connecting bar into the blocks with the ends extending into the hollows of the blocks; and
   fastening the panels to the beam by extending the bolt through the central bore to the beam and tightening the bolt.

12. The glass anchoring method as recited in claim 11, wherein the step of extending the connecting bar into the blocks further comprises extending the connecting bar downwardly through the gap with the connecting bar substantially parallel to the fastening edges of the panels and rotating the connecting bar so the ends extend into the hollows of the blocks until the connecting bar is substantially perpendicular to the fastening edges.

13. The glass anchoring method as recited in claim 12, wherein the step of extending the connecting bar downwardly through the gap further comprises extending the bolt downwardly through the gap.

\* \* \* \* \*